Jan. 13, 1970     G. MAIORINO     3,489,116
MACHINE FOR AUTOMATICALLY CUTTING AND PREBEADING
CYLINDRICAL BODIES, IN PARTICULAR METAL CANS
Filed Oct. 9, 1967     6 Sheets-Sheet 4

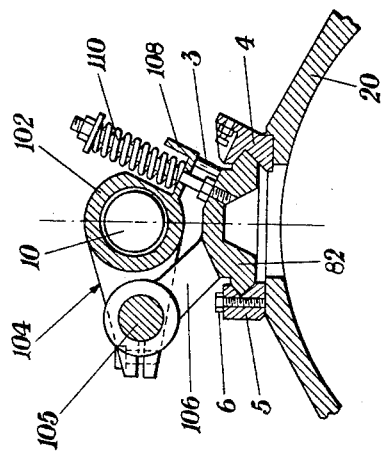

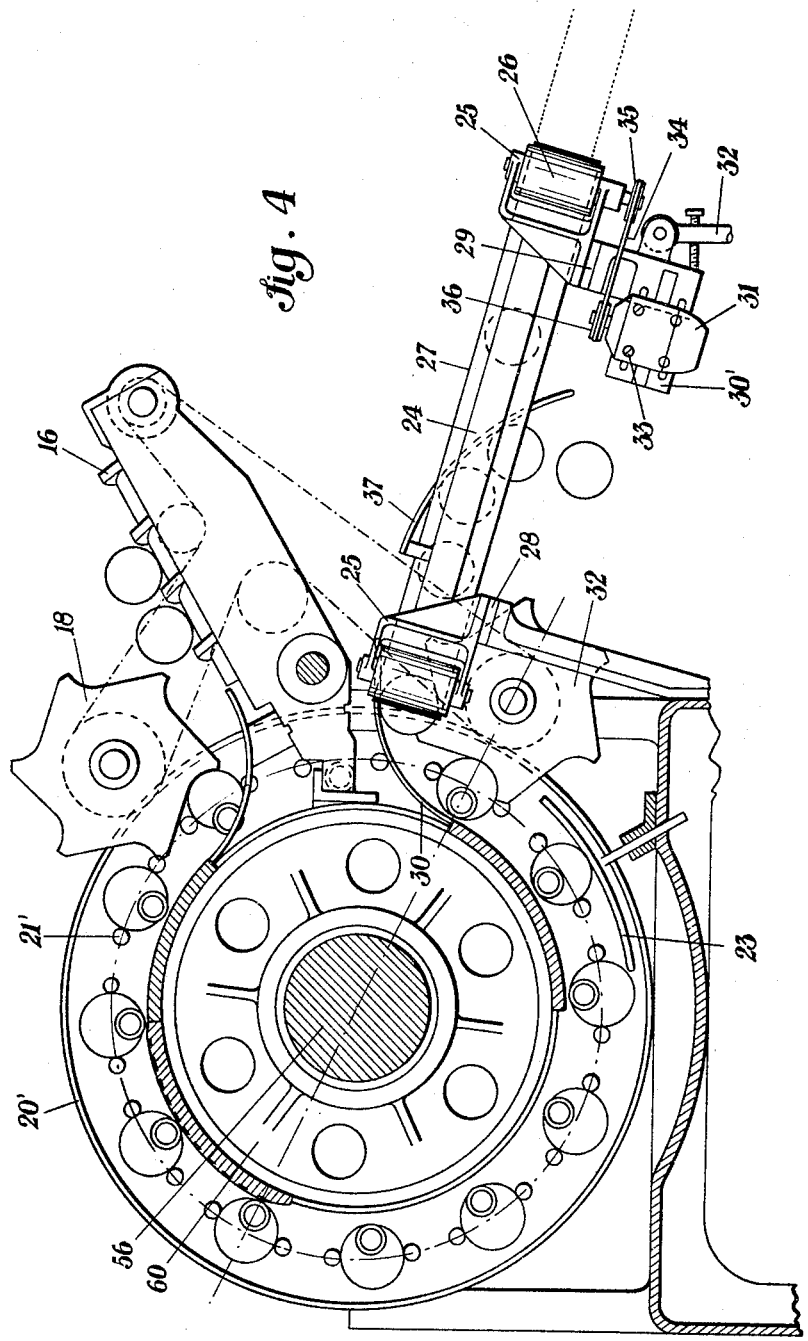

INVENTOR
GIUSEPPE MAIORINO

BY Irvin S. Thompson

ATTORNEYS

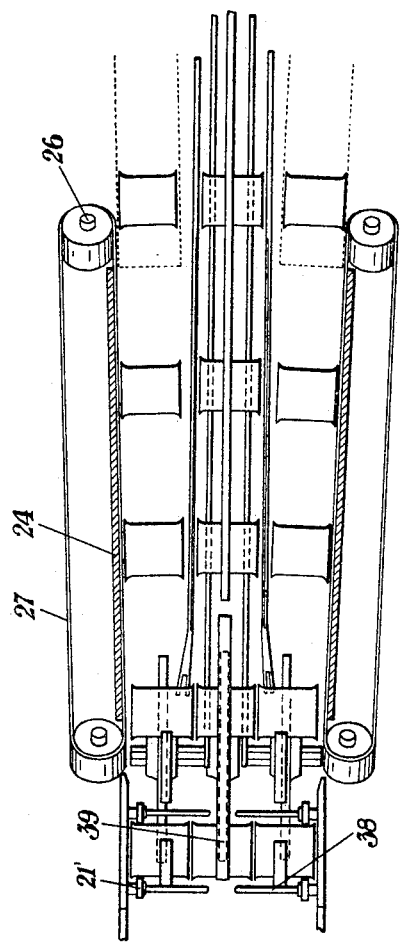
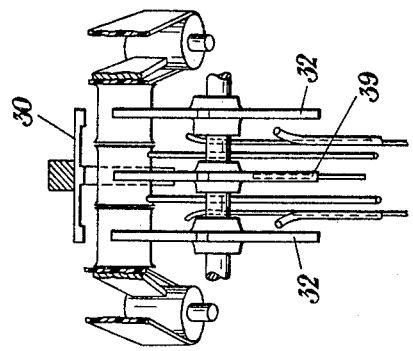

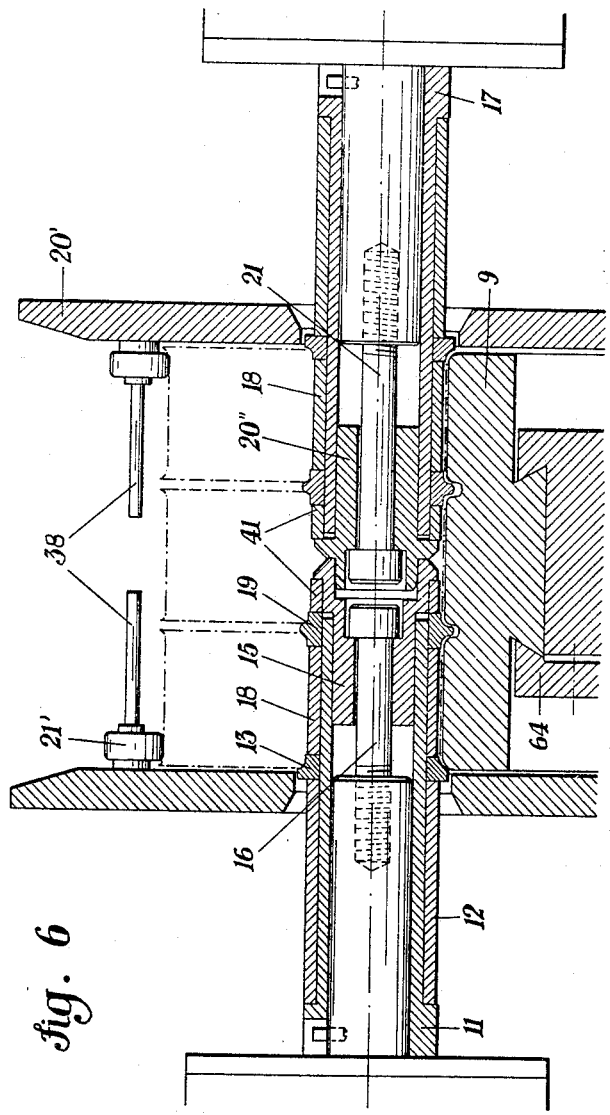

United States Patent Office 3,489,116
Patented Jan. 13, 1970

3,489,116
MACHINE FOR AUTOMATICALLY CUTTING AND PREBEADING CYLINDRICAL BODIES, IN PARTICULAR METAL CANS
Giuseppe Maiorino, Naples, Italy, assignor to FMI-Mecfond Aziende Meccaniche Riunite S.p.A., Naples, Italy
Filed Oct. 9, 1967, Ser. No. 673,817
Claims priority, application Italy, June 24, 1967, 37,743/67
Int. Cl. B21d 51/26
U.S. Cl. 113—7                                    13 Claims

ABSTRACT OF THE DISCLOSURE

A machine for automatically cutting and pre-beading cylindrical bodies, particularly metal cans, comprising, in combination, a monolithic frame carrying a rotor assembly formed by two guide disks and a double set of working chucks, arranged symmetrically to the axis of rotation of said rotor, normal to said disks and designed to accomplish the cutting and pre-beading operations, means for conveying in succession the elements to be cut on said chucks, means for controlling the axial traverse of the latter, and means for severing and conveying the cut and pre-beaded bodies.

---

The present invention relates to a machine for automatically cutting and pre-beading cylindrical bodies, in particular metal cans.

An object of the invention is to provide a machine of the mentioned kind, designed to effect the subdivision of hollow cylindrical elements in two or more segments (bodies) of a predetermined length and perform simultaneously the pre-beading of said bodies at their ends.

According to the invention, a machine is provided comprising, in combination, a monolithic frame carrying a rotor assembly consisting of two guide disks and a plurality of working chucks arranged symmetrically to the rotation axis of said rotor, normal to said disks and designed to perform the cutting and pre-beading operations, means for conveying in sequence the elements to be cut on said chucks, means for controlling the axial traverse of the latter, and means for severing and conveying the cut and pre-beaded bodies.

Said means for controlling the traverse of the chucks comprise two cams rigidly secured to the frame, and designed to cause the insertion of the bodies on said chucks by separation of the two elements forming the latter and removal of the cut and pre-beaded bodies.

The rotation of the rotor assembly and the rotation of the working chucks about their axes is obtained by means of a single drive unit, comprising an electric motor, an electromagnetic clutch and a gear train.

The invention will now be described with reference to the attached drawings, showing by way of illustration and in no way of limitation, a preferred embodiment of the invention.

Figure 1:
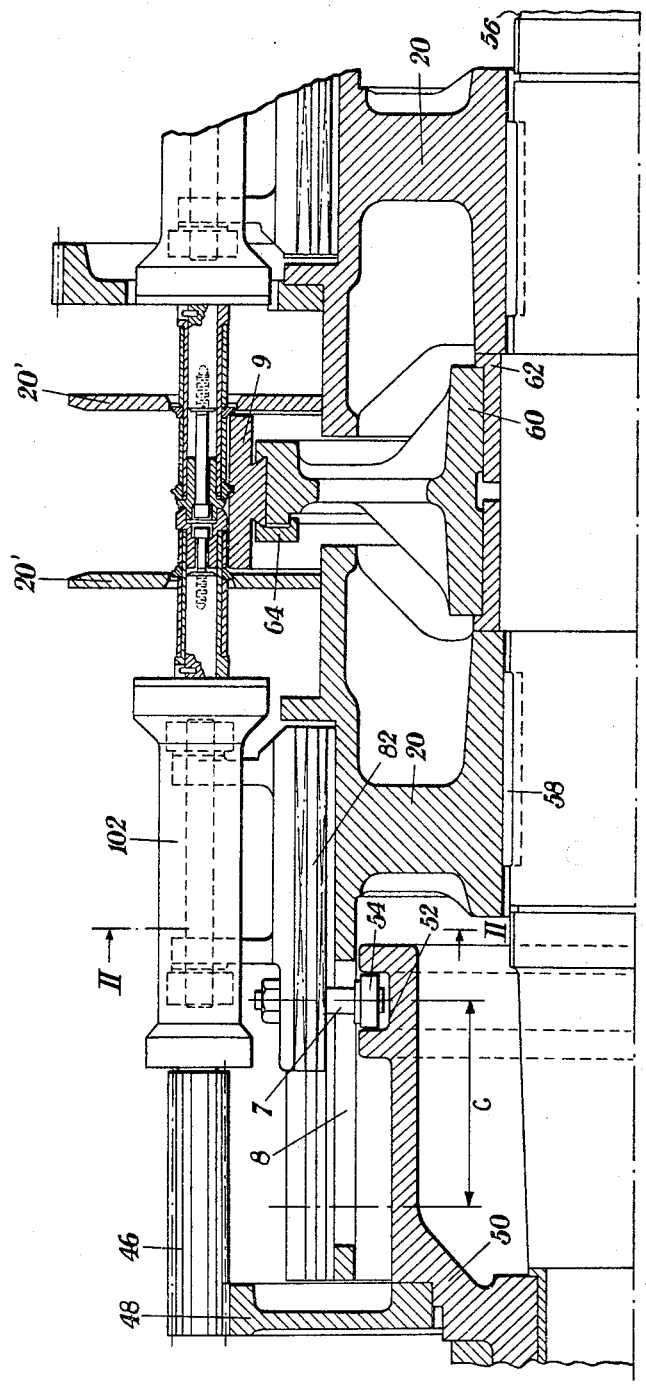
Figure 4A:
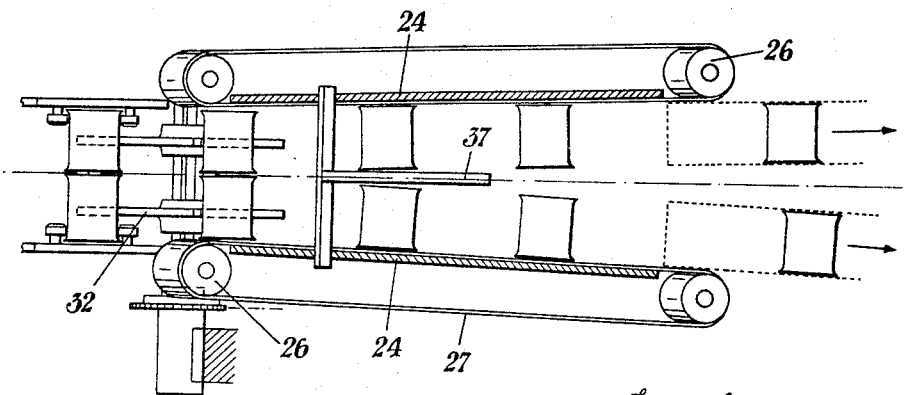
Figure 5:
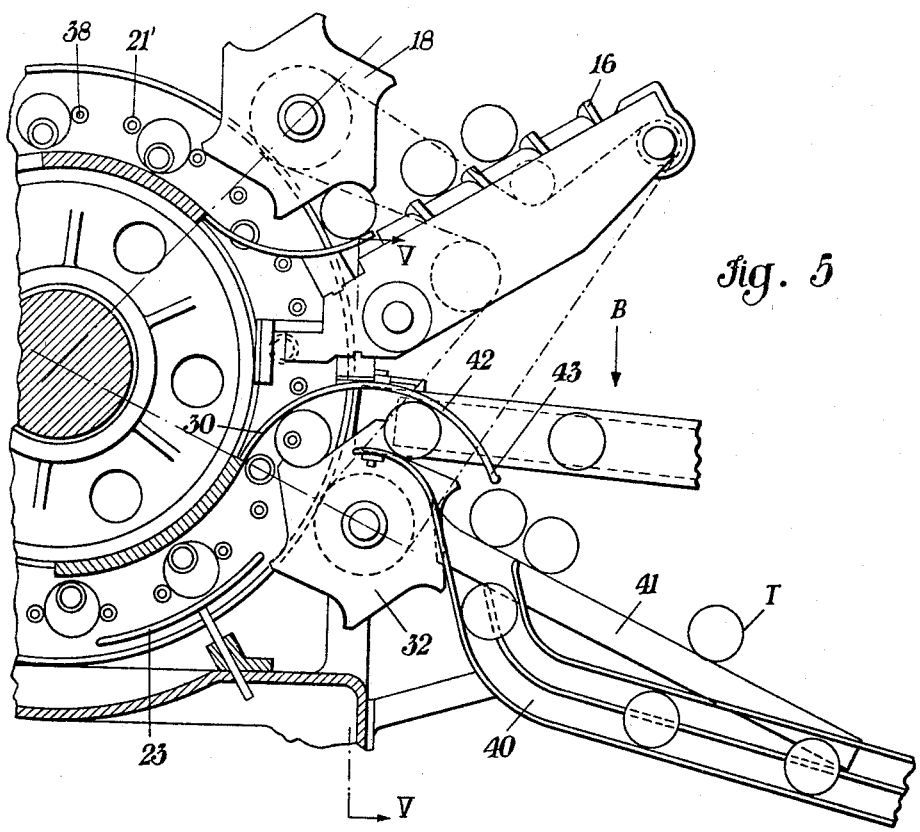

In the drawings:
FIGURE 1 is a fragmentary cross-sectional view along a plane passing through the rotor axis;
FIGURE 2 is a cross-sectional view along the plane II—II of FIGURE 1;
FIGURE 3 represents the detail of a chuck arranged for individual cutting, as seen in axial cross-section;
FIGURE 4 is a side elevation of the machine;
FIGURE 4A is a plan view of the detail of the exit magnetic separator;
FIGURE 5 is another embodiment of the machine of FIGURE 4, with a three-way exit separator;
FIGURE 5A is a sectional view along the plane V—V of FIGURE 5;
FIGURE 5B shows the exit separator of FIGURE 5, as seen from point B;
FIGURE 6 shows the detail of a chuck arranged for double cutting, as seen in axial cross-section.

With reference to FIGURE 1, the machine comprises a monolithic frame on which is mounted the motor unit comprising two turrets 20 placed on the revolving shift 56, two cams 50 rigidly secured to the frame for the traverse drive of the chucks 102 and a non-revolving tool holder ring 60, positioned at the center of the machine between the two turrets 20.

The rotation of the rotor is transmitted by the drive unit arranged inside and below the frame, comprising a gear train, an electromagnetic clutch and an electric motor. These elements are not described in detail as they are well known.

The cans to be cut are introduced in the machine through the feed unit (FIGURE 4) comprising a feed screw 16 and two star wheels 18 and 32. A star wheel 18 in synchronism with the screw 16, withdraws the cans taking them between the guide and transfer disks 20' which are arranged on the two revolving turrets. The other star wheel 32 (FIGURE 4) in synchronism with the disks 20' provides for the withdrawal of the cans, which having been cut during the rotation about the main axis of the machine are introduced in the magnetic conveyor which provides for the separation and conveyance thereof.

As previously set forth, the purpose of this machine is to increase the output of the cans on a line wherein the bodies are cut in one or more parts, even not equal one to another and pre-beaded, by utilizing a single machine.

The cutting unit formed by ancillary members and parts variable with the size, is mounted on the same swinging chucks 102, taking thus the same movements of the members that previously had been mounted, to provide the beads about the cans.

The simplicity and readiness with which these members are usually replaced depending on the different work they perform on the can bodies, without the machine undergoes any kinematic conversion, are the main features of the invention.

FIGURES 2 and 3 show the sections of the mounted ancillary and variable members forming the unit for the cutting of the can bodies.

The chuck 102 is the swinging member which by means of radial bearings supports the revolving shaft 10 on which the ancillary and variable members required for severing the bodies are mounted.

It is supported by the movable slide 82 by means of bosses 106 which fit in as many bosses 104 projecting sideways from the chuck 102 and connected one to another by a spindle 105 thus forming a hinge member.

At the opposite side of the hinge, by means of another boss 108, it too projecting from the chuck 102, there are arranged the stop pin 3 and the pressure spring 110.

This system is so embodied as to allow the elastic swinging of the chuck 102 when the longitudinal fold seaming of the can body being worked lies in correspondence with the working tools.

The movable slide 82 is placed on the turret 20 between two prismatic guides 4 and 5 fastened by means of screws 6 so as to slide therein during the rotation of the turret.

The traverse of the assembly is transmitted by the cam 50 arranged inside the turret and rigidly secured to the frame. The travel of the slide 82 is indicated by C in FIGURE 1.

From an end of the slide 82, in a position normal to the plane thereof projects the pin 7 which being constructed as a cam in order to obtain minor axial adjustments of the assembly, supports at its end the cam follower 54, which through the longitudinal slit 8 of the turret lodges into the race 52 suitably formed on the circumference of the cam 50 in order to obtain the axial travel of the assembly.

The sleeves 11 and 17 (FIGURE 3) which are part of the ancillary members, have the function of containing the variable members, such as the spacers 12, 14 and 18, the cutting tools 19 and the side pre-beading tools 13 and the ancillary collets 15 and 20''.

The sleeves are secured to the shafts 10 by means of the screws 16 and 21 and prevented from rotating by a dowel 22.

On the stationary drum 60 likewise to the lock system of the die for the formation of the beads, the segment 9 is arranged, on which will be formed one or more grooves depending on the number of the bodies to be severed in order to permit the penetration of the tool 19 during the severing operation.

In order to eliminate on the severed edges tearings or deflections due to thickness or hardness differentials which frequently occur on tin plate sheets, the bands of the bodies to be severed are to be cut at the severing line.

The can bodies to be severed are introduced in the machine for the severing operation according to the following way:

The cans driven by the screw 16 are drawn by the star wheel 18 and introduced between the guide disks 20'.

During this first step, the chucks which have started the approach travel enter the can body joining together and centering by means of the male and female collets 20'' and 15 which maintain them thoroughly coaxial during the severing operation.

The severing tool 19 which lies inside the can, by having a rotational motion about its axis, imparted by the gears 46 and 48, when during the rotation of the rotor meets with the segment 9, in performing the revolutions, imparts to the can a revolving motion.

The end of the tool 19 which thereafter enters the groove of the segment 9 is forced to sink from the inner wall to the outer one of the can at the cut, effecting thereby the severing operation.

The peripherical outline of the severing tool 19 has a shape suitable for providing during the severing operation the bending of the edges, so as to obtain, with the aid of the outer rings 13, they too similarly shaped, severed and pre-beaded cans.

The pre-beading aids at the beading operation, thus carried out in two steps avoiding the known breakage defects on the edges and the bulges which sometimes are encountered on the body end at the folded seam.

Single cutting

The two severed can bodies, while still between the guide disks 20' are driven by rollers 21' and guided from the outside of the guide 23 until they are grasped by the star wheels 32 which by means of another guide 30 take them to the magnetic conveyor (FIGURES 4 and 4A). The magnetic conveyor is an independent mechanism, formed by two elements, which, receiving the bodies severed by still paired from the star wheels 32, causes them to diverge on individual ducts.

Each element comprises a magnetic bar 24, acting also as connecting beam between the supports 25 of the rolls 26 required for the travel of the conveyor belt 27.

The two elements, arranged with the magnetic sides 24, one in front of the other, are secured at the ends on two braces 28 and 29 provided with eyes, one of which, 28, is rigidly connected to the frame and the other one 29, to the motor supporting plate 30' of the motor for the drive of the belt 27. The eyes on the braces 28 and 29 have the function to enable the adjustment of the elements according to the size of the cans.

The belt 27 of each element is driven by an independent motor. The motors 31 mounted on the plate 30', which in its turn is supported by a support 32 fastened on the floor, can slide thereon by means of the screws 33. Such an operation has the purpose of adjusting the speed of the conveyor belt 27 which is effected by means of two V-belt sheaves 34 one of which, 35, having a fixed race keyed on the shaft of the drive roll 26, and the other one 36, having a variable race, keyed on the shaft of the motor 31. In this way, when the cans which have been cut reach the conveyor, they, attracted by the magnetic force, adhere to the surface of the belt 27 which directs them to the ducts.

The segment 37 secured on the upper portion centrally of the two elements and facing down, has the function of expelling the possible unsevered can forcing it to change its route.

The two conveyor elements arranged not parallely one to another, but diverging toward the exit, allow the severed cans to move away from the center as not to meet the ejecting segment and continue their normal run toward the ducts.

Double cutting (FIGURES 5, 5A, 5B and 6)

The steps for the double cutting are similar to those described for the single cutting.

The three severed can bodies, still between the guide disks 20 are carried by the rollers 21 and the pins 38.

The rollers 21 carry the two side bodies and the pins 38, the central body. Then the bodies withdrawn, by the star wheels 32 and 39, reach the conveyor which is formed by the same magnetic elements used for the single cutting, plus a central duct 40.

The side bodies are withdrawn and directed to the ducts by the magnetic elements, while the central body carried by the star wheel 39 and still guided by an extension 42 of the guide 30 is pushed into the central duct 40 placed centrally and below the magnetic elements.

The extension 42 has also the purpose of ejecting the possible unsevered body, which pushed by the star wheels 32 and 39 gets over the elastic guide 43 and drops on two chutes which take it out of the ducts.

Said unsevered body is indicated by T in FIGURE 5.

The present invention has been described in a preferred embodiment thereof, but it is understood that changes and alterations can be made therein without departing from the scope of the invention.

Having thus described the present invention, what is claimed is:

1. A machine for automatically cutting and pre-beading cylindrical bodies, particularly metal cans, comprising, in combination, a monolithic frame carrying a rotor assembly formed by two guide disks and a double set of working chucks, arranged symmetrically to the axis of rotation of said rotor, normal to said disks and designed to accomplish the cutting and pre-beading operations, means for conveying in succession the elements to be cut on said chucks, means for controlling the axial traverse of the latter, and means for severing and conveying the cut and pre-beaded bodies.

2. Machine according to claim 1, wherein said chuck traverse control means comprise two cams, rigidly connected to the frame and designed to cause the insertion of the bodies to be cut on said chucks by severing the two elements forming the latter, and the removal of the cut and pre-beaded bodies.

3. Machine according to claim 1, wherein the rotation of the rotor assembly and the rotation of the working chucks about their axes are obtained by means of a single drive unit, comprising an electric motor, an electromagnetic clutch and a gear train.

4. Machine according to claim 1, wherein the rotation of the rotor assembly and the rotation of the working chucks about their axes are obtained by means of a single drive unit and said working chucks comprise a sleeve carried by a saddle slidable within prismatic guides by the drive of said cams, a shaft coaxial with said sleeve rotatably mounted therein and driven by the drive unit, and a working tool, rigidly connected with said shaft.

5. Machine according to claim 4, wherein each working tool comprises spacer collars and cutting and beading rings interchangeable so as to arrange said tools for cutting the cylindrical elements in plural segments.

6. Machine according to claim 5, wherein said elements of each working tool are restrained by male and female type collets, which mate upon the approach of the chucks to form a single working element.

7. Machine according to claim 4, wherein said working tools cooperate with a fixed ring carrying a plurality of grooves corresponding to the cutting and pre-beading zones.

8. Machine according to claim 7, wherein the chuck revolving shaft is carried by a plurality of bosses hingedly connected to the guides and elastically urged against said fixed ring by means of a set of adjustable springs.

9. Machine according to claim 1, wherein said conveying means of the elements to be cut comprise a worm screw, designed for forwarding said elements side by side, and a pair of star wheels which withdraw said elements and place them between said guide disks.

10. Machine according to claim 1, wherein said means for severing and conveying the cut and pre-beaded bodies, comprise, in case of single cutting, a pair of star wheels which grasp said bodies and a pair of conveyor belts, placed sideways to two parallel races and slidable on two vertical plates flanking said races.

11. Machine according to claim 1, wherein the severing and conveying means, in case of double cutting, comprise three races arranged side by side, fed by three revolving star wheels, the two lateral ones of which being provided with magnetic plate and conveyor belt, and the central one slanting downward in the shape of a chute.

12. Machine according to claim 11 wherein said races of the cut bodies have a deflecting elastic element, the purpose for which is to expel the possible uncut cylindrical elements.

13. Machine according to claim 10 wherein said races for the cut bodies have a deflecting elastic element, the purpose of which is to expel the possible uncut cylindrical elements.

References Cited

UNITED STATES PATENTS

| 3,310,972 | 3/1967 | Erlandson et al. | 113—120 |
| 3,375,798 | 4/1968 | Obidowski | 113—1 |
| 3,406,648 | 10/1968 | Arnbruster | 113—7 |

CHARLES W. LANHAM, Primary Examiner

MICHAEL J. KEENAN, Assistant Examiner